United States Patent [19]

Okabayashi et al.

[11] Patent Number: 5,120,404
[45] Date of Patent: Jun. 9, 1992

[54] METHOD OF PRODUCING AN ELECTRODE FOIL FOR USE IN ALUMINUM ELECTROLYTIC CAPACITORS

[75] Inventors: Masanori Okabayashi; Shinji Kabeya, both of Uji; Nobuyoshi Kanzaki, Joyo; Ryoichi Shimatani, Kyoto; Tsunetsugu Takasago, Osaka, all of Japan

[73] Assignee: Matsushita Electric Industrial Co., Ltd., Osaka, Japan

[21] Appl. No.: 729,657

[22] Filed: Jul. 15, 1991

[30] Foreign Application Priority Data

Jul. 16, 1990 [JP] Japan .................................. 2-189035

[51] Int. Cl.$^5$ ............................................. C25D 11/04
[52] U.S. Cl. ................................... 205/139; 205/332
[58] Field of Search ........................................ 204/28

[56] References Cited

U.S. PATENT DOCUMENTS 4,861,439  8/1989  Stevens ............................. 204/28

Primary Examiner—T. M. Tufariello
Attorney, Agent, or Firm—Panitch, Schwarze, Jacobs & Nadel

[57] ABSTRACT

There is provided a method of producing an electrode foil for use in aluminum electrolytic capacitors. This method includes the steps of (a) introducing a predetermined length of an aluminum foil into an electrolytic solution without supplying any current; (b) supplying a current to the aluminum foil until voltage becomes constant while keeping the aluminum foil stationary therein; (c) repeating the steps (a) and (b) for another predetermined length of the aluminum foil; and (d) finally holding the aluminum foil thus obtained while applying a constant voltage thereto. According to this method, an excellent electrode foil can be obtained which provides an aluminum electrolytic capacitor with high capacitance and significantly reduced leakage current.

4 Claims, 3 Drawing Sheets

METHOD OF PRODUCING AN ELECTRODE FOIL FOR USE IN ALUMINUM ELECTROLYTIC CAPACITORS

BACKGROUND OF THE INVENTION

1. Field of the Invention:

This invention relates to a method for producing an electrode foil for use in aluminum electrolytic capacitors.

2. Description of the Prior Art:

A conventional aluminum electrolytic capacitor has been produced as follows. First, an aluminum foil is subjected to electrolytic etching in an electrolytic solution containing chlorine ions for the purpose of enlarging the effective surface area thereof. Then, the aluminum foil thus treated is subjected to anodization (anodic oxidation) for forming an oxide film (dielectric film) on the surface thereof. The aluminum foil having a dielectric film is rolled up together with a sheet of insulating paper, and then impregnated with a driving electrolytic solution, resulting in an aluminum electrolytic capacitor.

As an electrolytic solution used for the electrolytic etching, an aqueous solution of hydrochloric acid or sodium chloride is used. Also as a current form, an alternating current, a direct current, a pulse current, or a combination thereof is used in the production on an industrial scale.

Various anodization processes for forming a dielectric film on an aluminum foil have been developed, and an aqueous solution of ammonium adipate has been widely used as an electrolytic solution for anodization processes conducted at a low voltage of 100 WV or lower. Because aluminum has a poor solubility in an aqueous solution of ammonium adipate, very little amount of aluminum is eluted into the electrolytic solution. Thus, when an electrode foil is produced using an aqueous solution of ammonium adipate as an electrolytic solution for the anodization process, the capacitance of an electrolytic capacitor using the resultant electrode foil becomes larger, as compared with the cases where other electrolytic solutions are used.

An improved anodization method using an aqueous solution of adipic acid as an electrolytic solution is disclosed in Japanese Laid-Open Patent Publication No. 61-121419. This method is used for aluminum foils previously subjected to electrolytic etching by the use of a pulse current.

The above-mentioned anodization process is usually conducted with an apparatus as shown in FIG. 1. The apparatus comprises a direct current (DC) power supply 2, an anodizing tank 3 containing an electrolytic solution 6, and a feed roller 1 made of a metal such as copper (Cu) or silver (Ag), which is disposed above the anodizing tank 3 and connected to the positive electrode of the DC power supply 2. Three electrode plates 4 are disposed in the anodizing tank 3 and connected to the negative electrode of the DC power supply 2. An insulating roller 7 is disposed in a lower section of the anodizing tank 3, and a transporting roller 9 is disposed above the anodizing tank 3.

In this conventional anodization process, aluminum foil 5 is continuously introduced downward along the feed roller 1 into the electrolytic solution 6 at a position between two adjacent electrode plates 4 in the anodizing tank 3, and transported along the insulating roller 7 to be directed upward, and conveyed through the electrolytic solution 6 between two adjacent electrode plates 4. As a result, an oxide film is formed on the aluminum foil 5, resulting in an anodized aluminum foil (electrode foil) 8. The anodized aluminum foil 8 is continuously conveyed out of the anodizing tank 3 along the transporting roller 9.

In this way, the aluminum foil 5 is continuously anodized in the electrolytic solution 6. However, an oxide film is not formed on the portion of the aluminum foil 5 which has just been introduced into the electrolytic solution 6. In other words, the aluminum foil 5 has no oxide film when it is located in area A as shown in FIG. 1. This causes a rush current flow with a density of about $3 \times 10^4$ mA/cm$^2$ to $2 \times 10^5$ mA/cm$^2$ through the aluminum foil 5 in the area A. As the aluminum foil 5 is further transported, an oxide film is rapidly grown thereon. With an increase in the thickness of the oxide film, the current density of the aluminum foil 5 in the electrolytic solution 6 is decreased.

Because of a rush current flow with such a high density, the surface irregularities of the aluminum foil which has previously been formed by etching is removed by dissolution. Thus, the effective surface area of the aluminum foil which has been enlarged by etching cannot be maintained at a satisfactory level. Also because of such a large electric current density, the resistance becomes large, thereby causing a power loss. This increases the cost of producing an electrode foil. Furthermore, the rush current with a high density generates Joule's heat, which causes a problem in that the temperature of both the electrolytic solution 6 and the surface of the aluminum foil 5 is increased.

In this conventional process, the aluminum foil 5 is continuously transported through the electrolytic solution 6 during the anodization process, and the oxide film is rapidly grown thereon. Since aluminum is eluted from the aluminum foil 5 at an extremely high rate, the eluted aluminum cannot be diffused throughout the electrolytic solution 6, thereby increasing the pH of the electrolytic solution 6 in the area near the surface of the aluminum foil 5. As a result, a large amount of aluminum hydroxide is deposited on the oxide film. With an increase in the thickness of the aluminum hydroxide film, satisfactory capacitance cannot be attained in an electrolytic capacitor using the electrode foil thus obtained.

Moreover, water in the aluminum hydroxide film reacts with aluminum in the oxide film, thereby causing deterioration in the quality of the oxide film. When an electrode foil having such a low-quality oxide film is used in an aluminum electrolytic capacitor, leakage current increases with time. Thus, the aluminum electrolytic capacitor using an electrode foil produced by the above conventional process has a short lifetime.

Furthermore, a small-sized aluminum electrolytic capacitor cannot be obtained by the use of such a conventional electrode foil.

SUMMARY OF THE INVENTION

The method of producing an electrode foil of this invention, which overcomes the above-discussed and numerous other disadvantages and deficiencies of the prior art, comprises the steps of (a) introducing a predetermined length of an aluminum foil into an electrolytic solution without supplying any current; (b) supplying a current to the aluminum foil until the voltage becomes constant while keeping the aluminum foil stationary therein; (c) repeating the steps (a) and (b) for another predetermined length of the aluminum foil; and (d) finally holding the aluminum foil thus obtained while applying a constant voltage thereto.

The electrolytic solution used in a preferred embodiment is an aqueous solution containing adipic acid, glutaric acid, sebacic acid, and ammonium salts of these organic acids. The electric conductivity of the electrolytic solution is preferably in the range of 30 to 200 ms/cm at 90° C., and the current density in the electrolytic solution is preferably in the range of 20 to 300 mA/cm$^2$.

Thus, the invention described herein makes possible the objectives of (1) providing a method of producing an electrode foil for use in aluminum electrolytic capacitors which assures high capacitance and significantly reduced leakage current in the electrolytic capacitor; and (2) providing a method of producing an electrode foil for use in aluminum electrolytic capacitors at a low cost.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
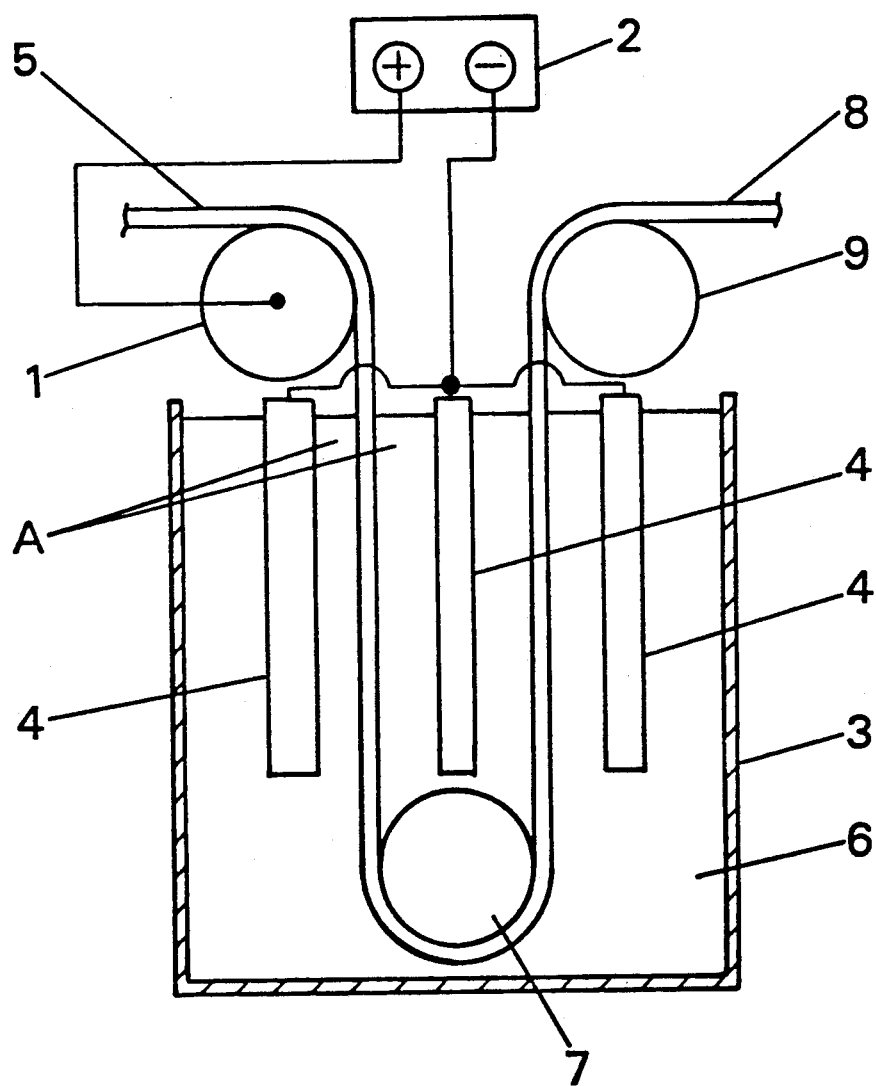
FIG. 1 is a schematic diagram showing an apparatus which is used in the production of an electrode foil for use in aluminum electrolytic capacitors.

In the method of producing an electrode foil according to this invention, the apparatus shown in FIG. 1 can also be used in an anodization process. An electrolytic solution used in the anodization process is an aqueous solution containing adipic acid, glutaric acid, sebacic acid, and ammonium salts of these organic acids. The electric conductivity of the electrolytic solution is in the range of 30 to 200 ms/cm at 90° C.

In the method of this invention, an electrode foil for use in aluminum electrolytic capacitors is produced as follows. First, a predetermined length of aluminum foil 5 is introduced along the feed roller 1 into the electrolytic solution 6 without supplying any current. Then, while the aluminum foil 5 is kept stationary in the electrolytic solution 6, a current with a constant density in the range of 20 to 300 mA/cm$^2$ is allowed to flow through the aluminum foil 5 until the voltage becomes constant. As a result of this anodization process, an oxide film is formed on the portion of the aluminum foil 5 immersed in the electrolytic solution 6, resulting in an anodized aluminum foil 8 in this portion. Then, the supply of current is cut off, after which the portion of the aluminum foil 5 having the oxide film (i.e., anodized aluminum foil 8) is transported out of the electrolytic solution 6, so that another predetermined length of the aluminum foil 5 is placed in the electrolytic solution 6 for the subsequent anodization process.

The anodization process is repeated in such a manner that the aluminum foil 5 is kept stationary in the electrolytic solution 6 during each anodization process and that no current is supplied thereto while the aluminum foil 5 is transported into or out of the electrolytic solution 6 between the successive anodization processes.

After the anodized aluminum foil 8 is taken out of the electrolytic solution 6, a constant voltage is applied thereto for a prescribed period of time for the purpose of aging, resulting in an electrode foil.

Figure 2:
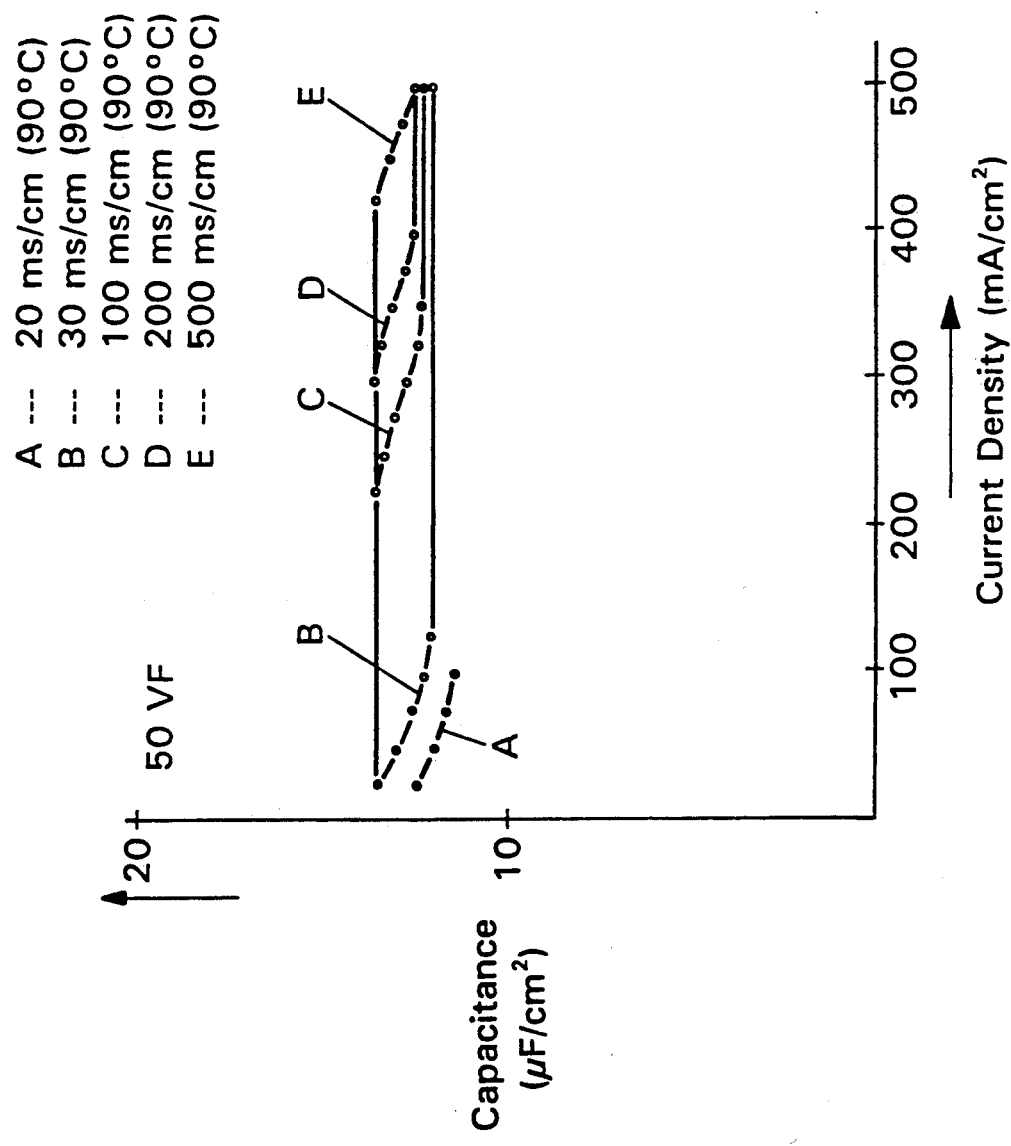
FIG. 2 is a graph showing the relationship between the current density used in the anodization process according to the method of this invention and the capacitance of an aluminum electrolytic capacitor using the electrode foil obtained by the anodization process.

FIG. 2 shows the relationship between the current density used in the anodization process and the capacitance of an aluminum electrolytic capacitor using the electrode foil obtained by the anodization process. For the production of electrode foils, an aluminum foil provided with surface irregularities was used. The anodization process was conducted with a current density set at different levels using five different electrolytic solutions which had respectively, electric conductivities of 20 ms/cm (A), 30 ms/cm (B), 100 ms/cm (C), 200 ms/cm (D), and 500 ms/cm (E) at 90° C.

As seen from FIG. 2, with an increase in the electric conductivity of the electrolytic solution, no significant decrease can be found in the capacitance of an aluminum electrolytic capacitor using the electrode foil, even if an increased current density is used in the anodization process. Thus, an appropriate combination of the current density and the electric conductivity of an electrolytic solution used in the anodization process makes it possible to produce an electrode foil for use in aluminum electrolytic capacitor having an improved high capacitance of about 13.4 $\mu$F/cm$^2$, as compared with a conventional alumin electrolytic capacitor having a capacitance of about 12.5 $\mu$F/cm$^2$.

It should also be noted that the power consumption required in the anodization process according to the method of this invention is lower than that required in a conventional anodization process. For example, when an electrode foil for use in aluminum electrolytic capacitors with a rated voltage of 100 WV is produced, the anodization process according to the method of this invention requires an electric power of 8.5 kWH/m$^2$, whereas an electric power of 14.2 kWH/m$^2$ is required in the conventional process. Thus, according to the method of this invention, an electrode foil for use in aluminum electrolytic capacitors can be produced at a low cost.

Figure 3:
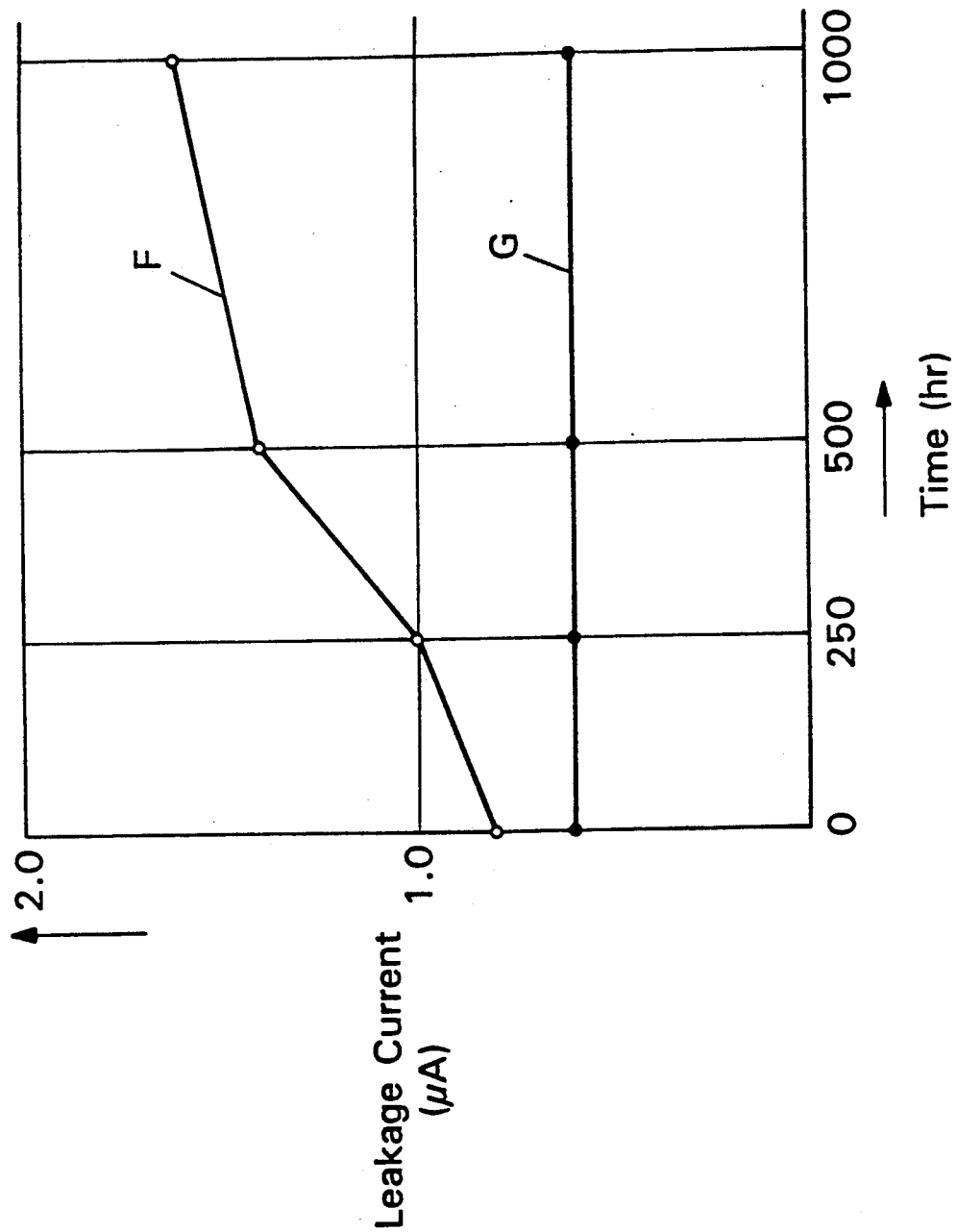
FIG. 3 is a graph showing the variation in leakage current with time for an aluminum electrolytic capacitor using the electrode foil produced by the method of this invention and for an aluminum electrolytic capacitor using an electrode foil produced by a conventional method.

FIG. 3 shows the change in leakage current with time, which was observed in an aluminum electrolytic capacitor with a rated voltage of 50 WV using an electrode foil produced by the method of this invention (line G) and in an aluminum electrolyte capacitor using an electrode foil produced by a conventional method (line F), when a direct current is supplied to each electrolytic capacitor. As can be seen from this figure, the leakage current observed in the conventional electrolytic capacitor F greatly increases with time, whereas the leakage current observed in the electrolytic capacitor G of this invention is kept at a level far lower than that observed in the conventional electrolytic capacitor F. Thus, when an electrode foil produced by the method of this invention is used in an electrolytic capacitor, the capacitor can attain significantly reduced leakage current.

According to the invention, for the purpose of reducing the leakage current in aluminum electrolytic capacitors, an electrode foil for use in the aluminum electrolytic capacitors can be produced with use of an aluminum foil with either rough surface or flat surface.

As described above, according to this invention, each predetermined length of an aluminum foil is introduced into an electrolytic solution without supplying any current and then kept stationary therein for an anodization process while a current being supplied thereto, followed by taking it out of the electrolytic solution without supplying any current to allow the next predetermined length of the aluminum foil to be placed in the electrolytic solution for the subsequent anodization process. Thus, since the aluminum foil is kept stationary during the anodization process, the current density in the electrolytic solution can be maintained at a low constant level until the voltage becomes constant. This prevents the aluminum foil from being dissolved, thereby preventing the removal of the surface irregularities thereof. Furthermore, there is no possibility that aluminum hydroxide will be deposited on the oxide film of the aluminum foil. As a result, an electrolytic capacitor using the electrode foil produced by the method of this invention can attain high capacitance and significantly reduced leakage current.

It is understood that various other modification will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A method of producing an electrode foil for use in aluminum electrolytic capacitors, comprising the steps of:
   (a) introducing a predetermined length of an aluminum foil into an electrolytic solution without supplying any current;
   (b) supplying a current to the aluminum foil until voltage becomes constant while keeping the aluminum foil stationary therein;
   (c) repeating the steps (a) and (b) for another predetermined length of the aluminum foil; and
   (d) finally holding the aluminum foil thus obtained while applying a constant voltage thereto.

2. A method according to claim 1, wherein the electrolytic solution is an aqueous solution containing adipic acid, glutaric acid, sebacic acid, and ammonium salts thereof.

3. A method according to claim 1, wherein the electric conductivity of the electrolytic solution is in the range of 30 to 200 ms/cm at 90° C.

4. A method according to claim 1, wherein the current density in the electrolytic solution is in the range of 20 to 300 mA/cm$^2$.

* * * * *